July 10, 1962 D. F. MELTON 3,043,448
VEHICLE-MOUNTED MANIPULATOR
Filed Sept. 19, 1958 5 Sheets-Sheet 1

INVENTOR.
DONALD F. MELTON
BY
Stuart R. Peterson
ATTORNEY

July 10, 1962    D. F. MELTON    3,043,448
VEHICLE-MOUNTED MANIPULATOR
Filed Sept. 19, 1958    5 Sheets-Sheet 2
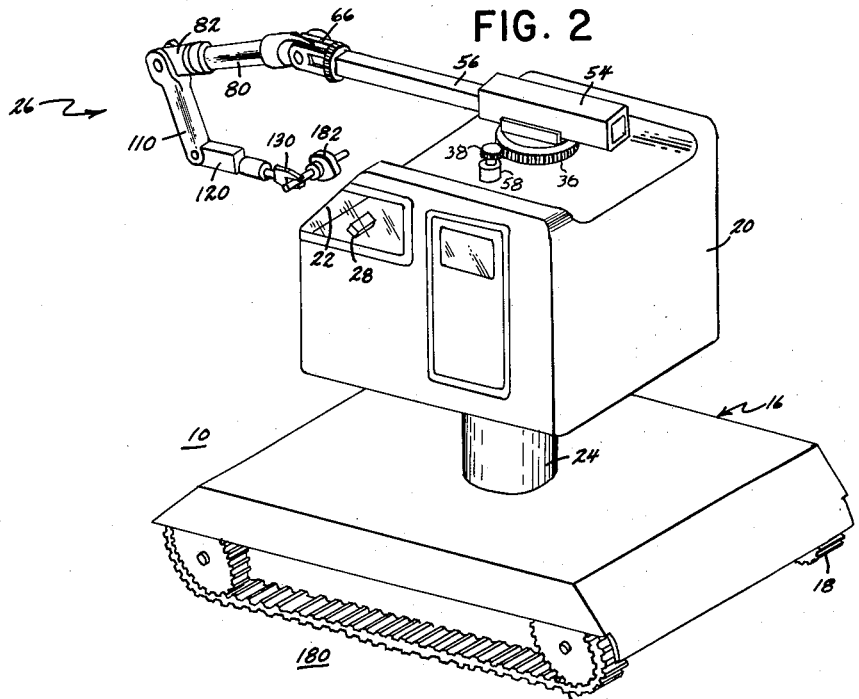
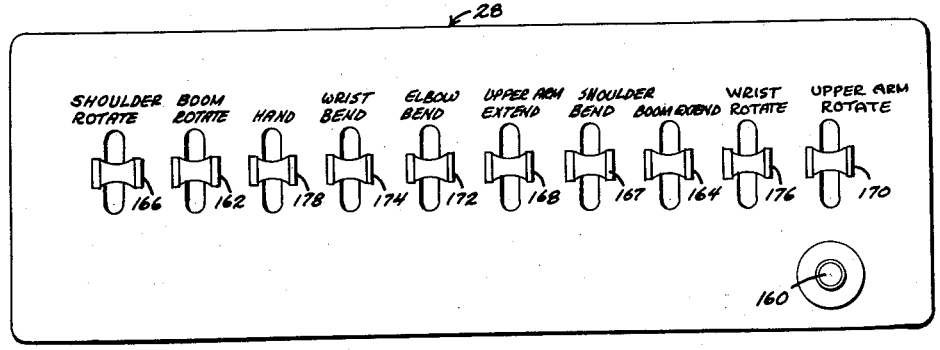
INVENTOR.
DONALD F. MELTON
BY
*Stuart R. Peterson*
ATTORNEY July 10, 1962  D. F. MELTON  3,043,448
VEHICLE-MOUNTED MANIPULATOR
Filed Sept. 19, 1958  5 Sheets-Sheet 3

INVENTOR.
DONALD F. MELTON
BY
Stuart R. Peterson
ATTORNEY

July 10, 1962  D. F. MELTON  3,043,448
VEHICLE-MOUNTED MANIPULATOR
Filed Sept. 19, 1958  5 Sheets-Sheet 4

INVENTOR.
DONALD F. MELTON
BY
Stuart R. Peterson
ATTORNEY

July 10, 1962 D. F. MELTON 3,043,448
VEHICLE-MOUNTED MANIPULATOR
Filed Sept. 19, 1958 5 Sheets-Sheet 5

INVENTOR.
DONALD F. MELTON
BY
Stuart R. Peterson
ATTORNEY

United States Patent Office 3,043,448
Patented July 10, 1962

3,043,448
VEHICLE-MOUNTED MANIPULATOR
Donald F. Melton, Minneapolis, Minn., assignor to
General Mills, Inc., a corporation of Delaware
Filed Sept. 19, 1958, Ser. No. 762,143
19 Claims. (Cl. 214—1)

This invention relates to material handling apparatus, and pertains more particularly to a vehicle-mounted manipulator for use in performing a wide range of manipulations in uninhabitable environments, such as areas that are radioactive, toxic, high and low temperature or vacuum in nature.

Accordingly, one object of the invention is to provide an articulated manipulator having many degrees of freedom, yet in which the operator of the manipulator is maintained in an inhabitable environment within a protective cab carried by the vehicle on which the manipulator itself is mounted. Depending upon the type of dangerous environment, the cab will be mass-shielded against radioactive radiation, sealed against toxic gas leakage and/or pressurized and supplied with oxygen. Thus, the above arrangement allows the operator to control the manipulator from a safe vantage point within the cab while performing various manipulations in the uninhabitable area or environment.

By way of a specific illustration, it might be explained that in the de-mating or de-mounting of nuclear aircraft engines, it is expected that a preliminary inspection will be made by thrusting a small television camera into the engine compartment, possibly attaching said camera to one of several brackets provided at strategic viewing locations within the compartment so that the actual de-mating procedure can then be effected. The de-mating procedure will, of course, include the loosening of bolts through the use of a rotary impact wrench carried by the hand mechanism. Also, at times it is envisioned that small pliers will have to be manipulated by the hand mechanism in the connecting and disconnecting of electrical wires. Further, a screwdriver and other tools will on occasion be employed. Still further the entire hand mechanism may be removed when circumstances so dictate to permit special implements or other hand mechanisms to be employed.

Still further, after the nuclear engine has been removed to a service area, various parts thereof will require disassembly and close inspection. In this latter regard, it is intended that the manipulator be capable of flexing itself in such a manner as to bring the individual parts into close proximity with the viewing window (or windows) of the shielded cab in which the operator is stationed. The cab itself will support the manipulator, the cab in turn being mounted on a suitable vehicle possessing sufficient mobility for carrying out the various tasks to which the manipulator is apt to be assigned.

While procedures will vary, depending upon the particular manipulative tasks to be performed, nonetheless the foregoing description will serve as an indication of the general requirements that must be met with the envisaged material handling unit.

In the drawings,

FIG. 2 is another perspective view illustrating the material handling unit with its hand mechanism brought into proximity with the viewing window of the cab, which is mounted on a mobile vehicle;

FIG. 3 is a front view of the control panel situated in the cab, by means of which the operator controls the various movements of the manipulator;

Figure 4:
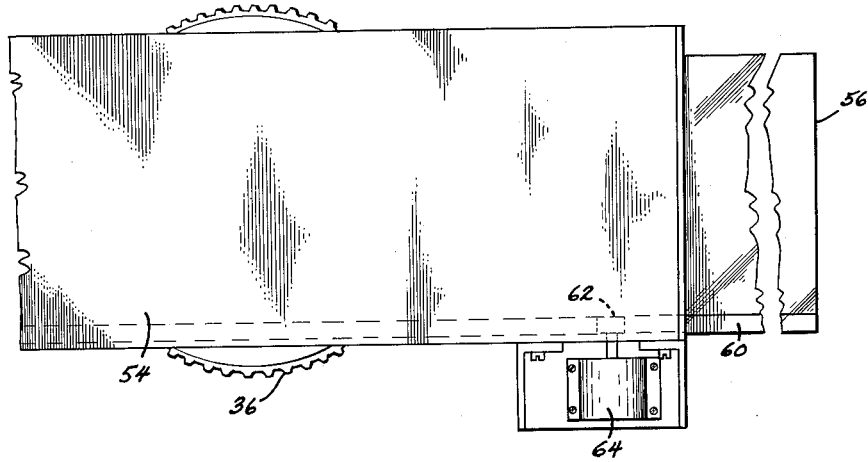
Figure 7:
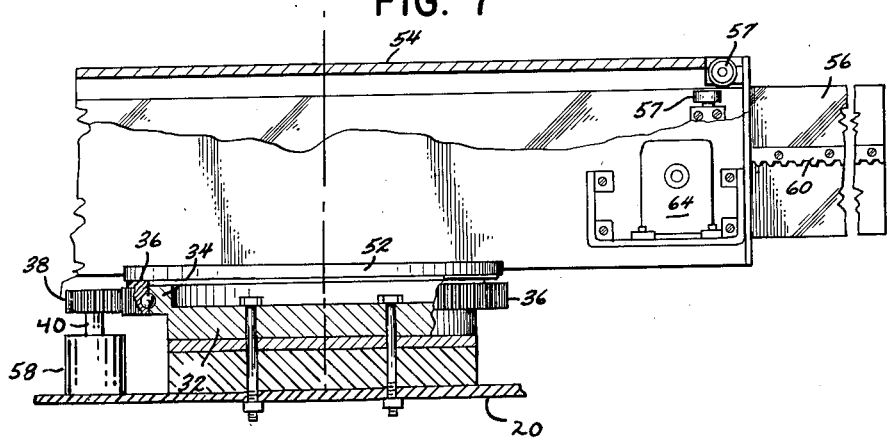
Figure 5:
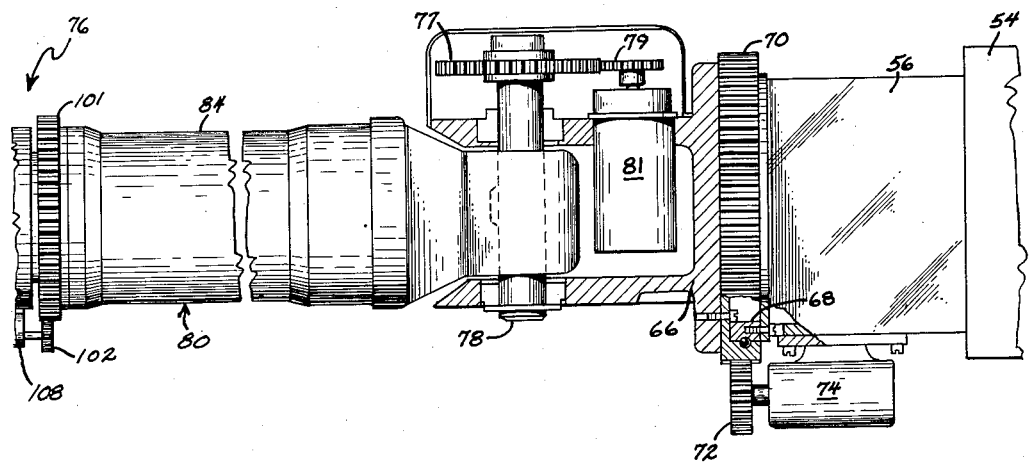
Figure 8:
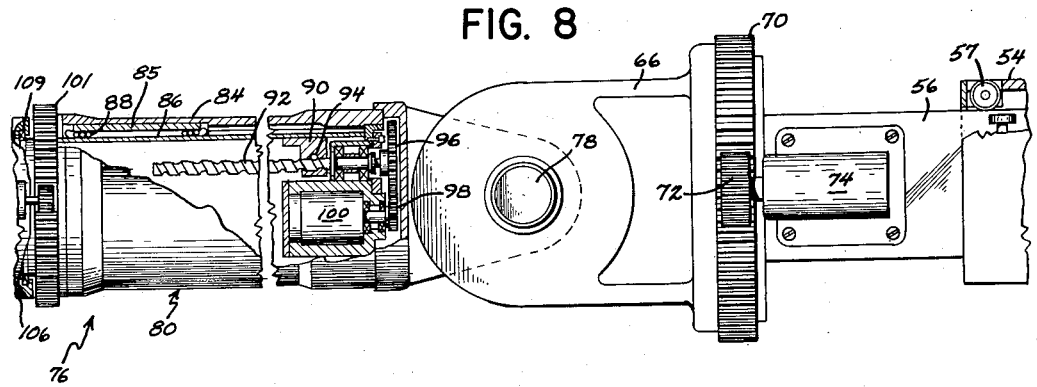
Figure 6:
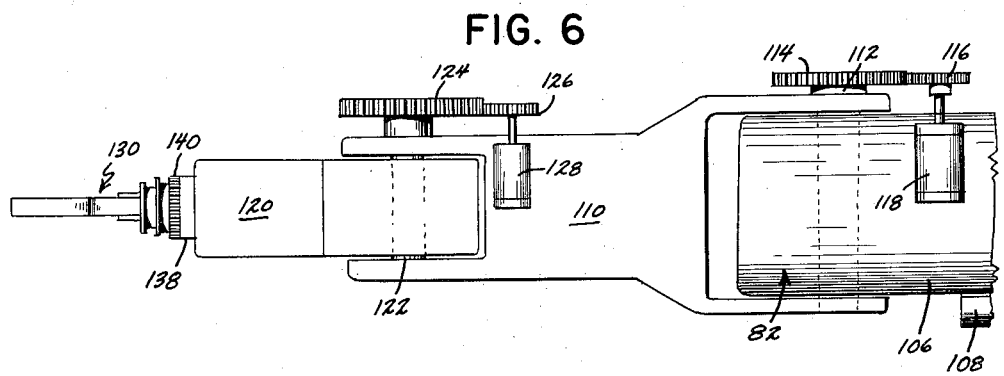
Figure 9:
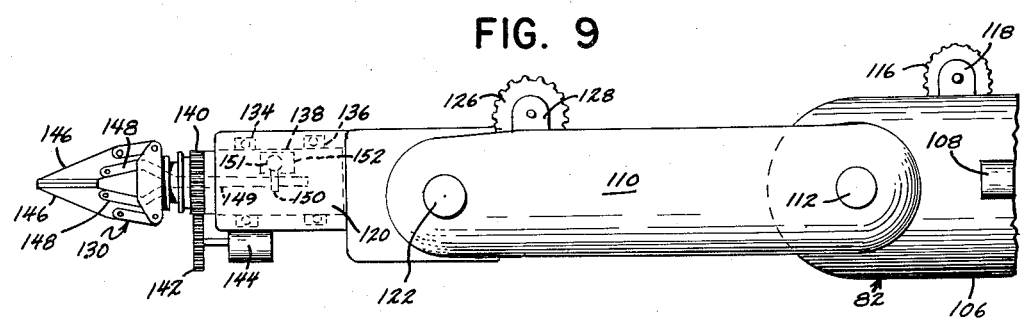

FIGS. 4, 5, and 6, when placed side by side, represent a plan view of the manipulator portion of the material handling unit; and FIGS. 7, 8, and 9, when placed side by side, represent a side elevation view of the manipulator portion of the material handling unit, these latter views being physically oriented relative to FIGURES 4, 5, and 6.

Figure 1:
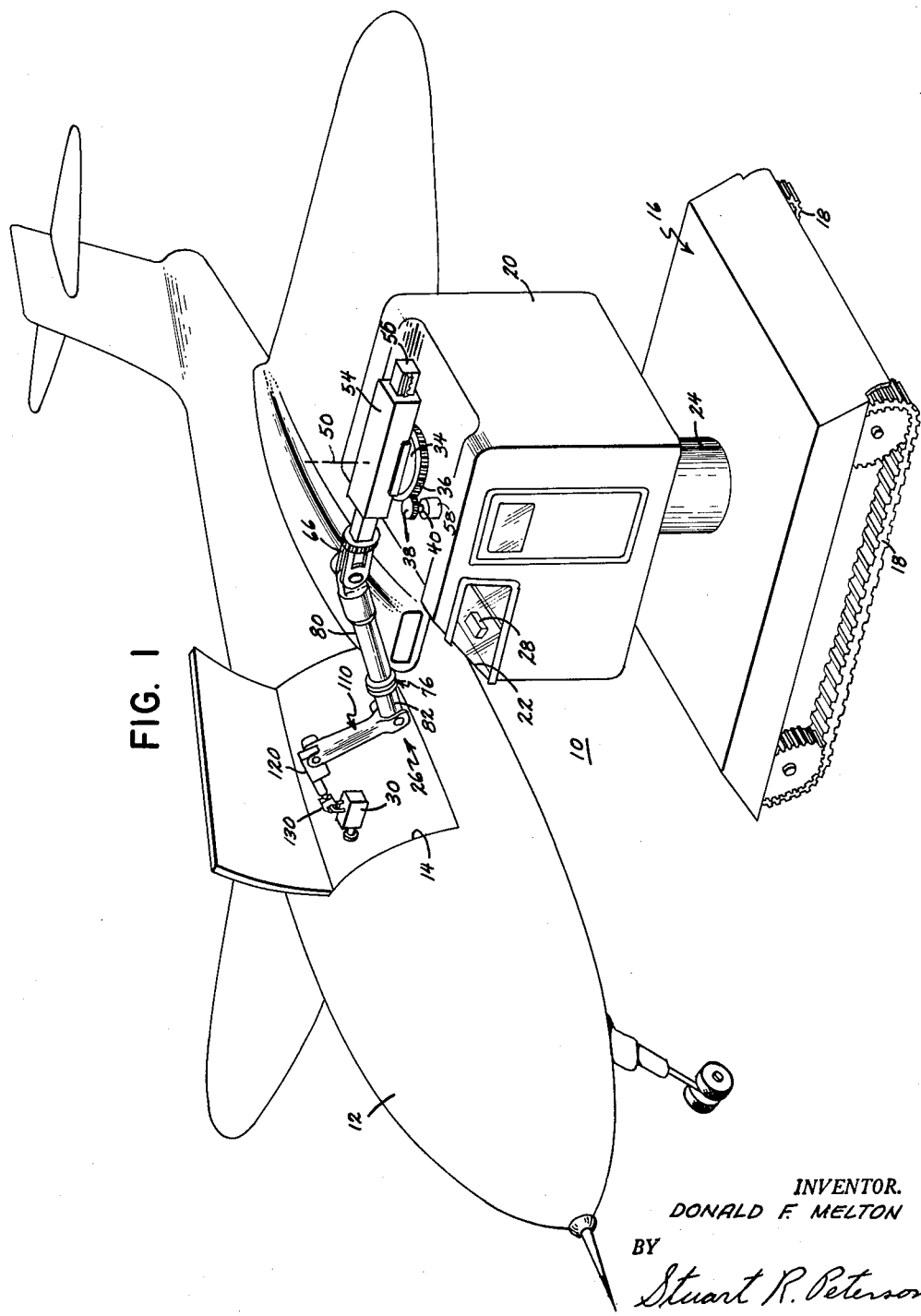
FIGURE 1 is a perspective view of the material handling unit exemplifying the invention, the view illustrating the unit within an uninhabitable area and in a servicing relationship with a nuclear powered airplane.

Referring now in detail to the drawings, attention is first directed to FIG. 1 where an uninhabitable area 10 will be considered to be involved. Within this area is situated a nuclear powered aircraft 12 having an opening at 14 leading into the engine compartment. For the sake of discussion it will be assumed that the nuclear engine within said compartment is to be de-mated for removal to a special service area.

Located in a proximal relationship to the aircraft 12 is a vehicle 16 provided with endless tracks 18 in the exemplified instance. While the vehicle is not shown in detail, it will be appreciated that the vehicle is mobile in character and can be moved about the work area 10 into various work-performing positions relative to the aircraft 12 or whatever object is to be worked on.

Surmounting the vehicle 16 is a shielded (we are here assuming the area 10 to be radioactive in character) cab 20 provided with a viewing window 22 whereby the operator located in the cab may observe the surrounding area within the work area 10. The cab 20 is mounted directly on a telescoping vertical shaft 24 which will not be described in detail other than to say that said shaft may be extended upwardly to a preferred elevation by reason of the various telescoping sections comprising this shaft. Also the shaft is rotatable about a vertical axis. The apparatus for elevating the cab by extending the shaft 24 is located within the body of the vehicle 16 and may be of a hydraulic nature. Likewise, the motor for rotating the cab 20 about a vertical axis provided by shaft 24 is situated within the vehicle 16. In this way, the cab itself is left relatively unencumbered.

An articulated manipulator designated generally by the reference numeral 26 is carried by the cab 20. This manipulator 26 will be described in detail presently. However, at this particular time, reference will be made to a control panel 28 housed within the cab 20 by which the manipulator 26 can be maneuvered through various angles and positions in order to carry out designated tasks. As shown in FIG. 1, the manipulator 26 is carrying at its free end a television camera 30, which can be inserted through the opening 14 into the engine compartment. By so doing, a preliminary investigation can be made of the engine before de-mating it from its mounting. Further, the camera 30 may be left within the engine compartment during the actual de-mating or demounting of the engine, suitable mounting brackets being disposed at strategic locations within the compartment for this particular purpose.

On top of the cab 20 is fixedly disposed a mounting plate 32 (see FIG. 7). Fixedly attached to the mounting plate 32 is what will be termed a boom rotate bearing 34. Circumscribing the bearing 34 is a boom rotate ring gear 36. Enmeshed with the gear 36 is a drive pinion 38 secured to the upper end of a drive shaft 40. At the lower end of shaft 40, which is entirely outside the cab 20, is a mechanically coupled boom rotate motor 58. By reason of the foregoing bearing construction which supports the articulated manipulator 26, it can be seen that the manipulator can be rotated about a vertical axis 50, this rotation being relative to the cab 20.

Mounted directly to the ring gear 36 for rotation therewith is a cradle 52. The cradle 52 has secured thereto a boom support 54 of rectangular cross section. The boom support 54 translationally carries or telescopically receives a boom member 56. Through the agency of guide rollers 57 the boom member 56 is constrained for rectilinear advancement and retraction with respect to the boom support 54.

The manner in which the advancement and retraction is realized is by means of a rack 60 extending along one side of the boom member 56. The rack 60 is engaged by a pinion 62 rotatable by a drive motor 64, which drive motor is mounted directly on the boom support 54.

At one end of the boom member 56 is situated a shoulder support 66. It will be observed from FIGS. 5 and 8 that the shoulder support is relatively short. While the boom member 56 is moveable along a horizontal axis provided by the boom support 54, the shoulder support 66 is rendered rotatable about this same horizontal axis by virtue of a shoulder rotate bearing 68 which is adjacent a shoulder rotate gear 70. Enmeshed with the gear 70 is a shoulder rotate drive pinion 72 rotatable by a shoulder rotate motor 74.

As indicated in the preceding paragraph, the shoulder support 66 is relatively short. A distinct advantage results by having this support 66 of relatively small mass. More specifically, instead of rotating the entire boom member 56 about the horizontal axis above referred to, only the shoulder support 66 is rotatable about this axis. Consequently, while a desired motion is realized, it is not necessary to rotate the whole boom member 56 about its own longitudinal axis. In this way the load on the boom resulting from the projecting elements of the manipulator yet to be described, plus any load carried at the free end of the manipulator will always be in a vertical direction and the boom support 54 and boom 56 need only be designed and reinforced to carry such loads because of the specific direction in which said loads will be applied. This permits the boom and its support to be strengthened more in a vertical direction than horizontally with a resulting simple and compact construction.

Next to be described is what will be called an upper arm 76. This upper arm is pivotal about an axis perpendicular to the axis of rotation of the shoulder support 66. To provide this pivotal movement, a shoulder joint shaft or pin 78 extends through one end of the shoulder support 66 and due to the relatively short length of the support 66, the joint shaft 78 is thus located near the boom 56. The actual pivoting is achieved by a gear 77 mounted on an end of pin 78, this gear being engaged by a pinion 79 rotatable by an upper arm pivotal motor 81. Motor 81 is fixedly attached within the shoulder support member 66 as seen in FIG. 5.

As best observed in FIGS. 8 and 9, the upper arm 76 is comprised of a first section 80 and a second section 82. Referring more specifically to the first section, it will be perceived that this section includes an outer sleeve or tube 84 connected directly to the shoulder support 66 via the above alluded to shoulder joint pin 78. The tube 84 has a cylindrical raceway 85 mounted therein provided with angularly spaced longitudinal grooves.

The section 82 includes an inner sleeve or tube 86 having similarly arranged grooves. Through the medium of a plurality of balls 88 disposed in these angularly registered grooves, the section 82 which includes the tube 86 is guided for rectilinear motion along the longitudinal axis of the upper arm 76.

The means by which the rectilinear motion of the inner tube 86 relative to the outer tube 84 is achieved includes an L-shaped bracket 90 fixedly secured to the inner surface of the tube 86. The bracket is apertured and threaded for the accommodation of a ball screw element 92. Through the agency of balls 94 it can be appreciated that rotation of the screw element 92 will cause selective advancement or retraction of the inner tube 86 relative to the outer tube 84.

In achieving the advancing and retracting of the inner tube 86 with respect to the outer tube 84, a gear 96 is mounted on one end of the ball screw element 92 and a drive pinion 98 enmeshed with this gear causes the desired rotation of the ball screw element 92. The drive pinion 98 is rotatable by a motor 100 which is fixedly secured to the outer tube 84.

The inner sleeve or tube 86 carries an integrally supported peripheral gear 101 which is engaged by a pinion 102 rotatable by a drive motor 108 mounted on an outer sleeve or tube 106 constituting part of the second section 82. To effect the desired rotation of the second section 82 about the longitudinal axis of the upper arm 76, it can be explained that a pair of axially spaced bearings is utilized between that portion of the tube 86 received in the outer tube 106 of the second section 82. One such bearing 109 appears in FIG. 8 owing to the cut-away section presented at the left of this particular figure.

Consequently, it will be appreciated that while the upper arm 76 is pivotal about the shoulder joint 78, the two sections 80 and 82 constituting the upper arm are both relatively extensible and rotatable about the longitudinal axis of this upper arm.

The next member to be described is the forearm labelled 110. The forearm is pivotal about a transverse axis which is perpendicular to the longitudinal axis of the upper arm 76 by reason of a shaft or pin 112. The actual pivoting is achieved by a gear 114 mounted directly on one end of the pin, this gear being engaged by a pinion 116 rotatable by a forearm pivotal motor 118. As can be discerned from FIG. 6, the forearm pivotal motor 118 is fixedly located on the second section 82 of the upper arm 76.

While one end of the forearm 110 is pivotally connected to one end of the upper arm 76 as described above, the opposite end of the forearm 110 pivotally carries a wrist member 120. To render the wrist member 120 pivotal relative to the forearm 110, a transverse shaft or pin 122 is provided. As can be seen from FIG. 6 the shaft or pin 122 has integral therewith a gear 124 which is driven by a pinion 126, the pinion in turn being driven by a motor 128 mounted directly on the forearm.

The wrist member 120 is centrally hollowed for the rotatable accommodation of a hand mechanism denoted by the reference numeral 130. To cause rotation of the hand mechanism about its own longitudinal axis, which axis incidentally is also the longitudinal axis of the wrist member 120, a pair of bearings 134, 136 are disposed within the wrist member. These bearings serve as the rotatable support for the hand mechanism 130. More specifically, the hand mechanism 130 includes a cylindrical portion 138 which is received by said bearings 134 and 136.

To produce the rotation of the hand mechanism 130 about its own longitudinal axis, a gear 140 is provided on the projecting part of the cylindrical portion 138. This gear is driven by a pinion 142 which is actuated by a motor 144 mounted directly on the wrist member 120.

As can be seen from an inspection of FIG. 9, the hand mechanism includes a pair of pivotal jaw elements 146. These jaw elements 146 are attached by a pair of links 148 connected at one end to said jaw elements and connected at the other end to a threaded plunger 149 extending into the cylindrical portion 138. The threaded plunger 149 is advanced or retracted by means of an internally threaded worm gear 150 suitably held against axial movement, the worm gear encircling said plunger 149. Rotation of the worm gear 150 is accomplished by a worm 151 actuated by a motor 152 contained within the cylindrical portion 138.

Earlier the control panel 28 was mentioned. From FIG. 3 it can be discerned that this panel has mounted thereon a "power on" switch 160 for the purpose of energizing the panel circuits (not shown). A double throw toggle switch 162 is in circuit with the motor 58 whereby the boom may be rotated about the vertical axis 50. By reason of a similar switch 164 the motor 64 may be energized to cause advancement or retraction of the boom 56 relative to its support 54. Another switch 166, which is in circuit with the motor 74, effects rotation of the shoulder support 66 about the horizontal axis of the boom 56. Similarly, switch 167, which is in circuit with the motor 81, produces a pivoting of the upper arm member 76 about the joint 78. Likewise, a switch 168 permits energization of the motor 100 so as to cause extension or retraction of the inner tube 86 of the upper arm 76. Another switch 170 permits the section 82 to be rotated about the longitudinal axis of its arm 76, such switch energizing the motor 108 in the desired direction. Next, a switch 172 effects an actuation of motor 118 to produce an "elbow bend" at the joint 112. Further, a switch 174 causes power to be furnished to the motor 128, thereby producing a pivoting of the wrist member 120 about the joint 122. Still further, a switch 176 accomplishes the energization of the motor 144 and thus a rotation of the hand mechanism 130 about its own longitudinal axis. Finally, by means of a switch 178, the jaw elements 146 may be actuated into an open or closed position, the motor 152 being in circuit with this particular switch.

In order to better illustrate the operation of the present invention it will be assumed that the operator is located inside the cab 20 and has as an ultimate objective the removal of a certain part from the nuclear aircraft engines. In order to facilitate this removal, the engine must be first de-mated or de-mounted from the air frame, as would be done in FIG. 1, and removed to a servicing area or workshop, as represented in FIG. 2, where it can be worked on by the same material handling unit depicted in FIG. 1 or a second such unit.

The first step in practicing the present invention is to insert the camera 30 into the engine compartment via the opening 14 to a suitable location to enable the operator to observe what he is doing, as seen in FIG. 1.

After inserting the camera 30, it will be necessary to loosen the bolts which fasten the engine to the air frame. This may be accomplished by a number of different movements of the various elements, by actuating the switches and thereby energizing each individual motor.

For purposes of illustration it is assumed that all movements will be utilized in order to fulfill a certain task, as, for example, the removal of the bolts affixing the engine to the air frame. By operating switch 162, the entire manipulator 26 can be caused to rotate about the vertical axis 50 in order to facilitate entry into the engine compartment from various angles. Switch 162 energizes motor 58, which has the shaft 40 with the drive pinion 38 keyed thereon. Intermeshing with the drive pinion 38 is the ring gear 36, which has the boom support 54 affixed thereto. The boom support 54 can be rotated in either direction, depending upon the direction of rotation of the drive pinion 38 and being opposite in direction thereto.

To facilitate movement of the shoulder support 66 in a horizontal direction away from or toward the boom support 54, the rack 60 is provided with a plurality of teeth thereon, being attached to the boom member 56. Meshing with this rack is the pinion 62 which is rotatable in either direction by the motor 64, which is energized by switch 164.

By energizing the motor 81 by manipulation of the switch 167, the pinion 79 is caused to rotate in a clockwise or counter-clockwise direction. Pinion 79 meshes with gear 77 and causes an opposite rotation of gear 77 relative to the direction of rotation of pinion 79. The pivotal action accomplished by this actuation will enable the operator to swing the upper arm 76 a total of 180°, or 90° about the longitudinal centerline of the boom 56.

A continuous rotation of the gear 70 in either direction causes the shoulder support 66 to rotate about the longitudinal axis of the boom 56, and enables the projecting end of the upper arm 76 to move through a desired arc, whose radius, as taken from the longitudinal axis of the boom 56, is determined by the angle which the longitudinal axis of the upper arm 76 makes with the longitudinal axis of the boom 56. Switch 166 energizes motor 74, which causes drive pinion 72 to rotate gear 70, the direction of rotation of gear 70 being opposite in direction to that of drive pinion 72.

Energizing motor 100 through switch 168 causes the second section 82 of the upper arm 76 to extend or retract relative to the first section 80 of the upper arm. This movement will permit an object to be reached by extension or retraction in a different plane from the plane of boom 56.

Rotation of the second section 82 of the upper arm about the longitudinal axis of the upper arm 76 is effected by the motor 108 which is energized by switch 170. Motor 108 is located on the second section 82 of the upper arm and has its drive pinion 102 meshing with gear 101 to cause this rotation. It is realized, of course, that rotation of section 82 causes a different kinematic relationship of the forearm 110 than rotation of the gear 70, and is, of course, dependent on the degree of pivotal movement of the upper arm about the shoulder joint 78.

A pinion 116 affixed to the motor 118, which is located on section 82 of the upper arm for rotation therewith, meshes with gear 114, which is keyed to the shaft 112. Rotation of gear 114 causes the forearm 110 to pivot about the shaft 112 and form an elbow joint. It is appreciated that a rotation of section 82 of the upper arm 76, when the forearm 110 is pivoted at the elbow, so that the longitudinal axis of the forearm 110 makes an angle with the longitudinal axis of the upper arm 76, causes a different kinematic relationship than that which exists when the forearm 110 is parallel to the upper arm 76.

Similarly, pivoting the wrist member 120 about the axis 122, which has gear 124 keyed thereto, engaging with pinion 126 and driven by motor 128, enables the operator to attain one more angular position relative to the axis of the forearm 110.

The motions which have been described may be said to be positioning movements, in that they are used to locate the hand or grip mechanism 130 in the desired position relative to the work to be performed. The last two motions to be described may be said to be the actual work performing motions in that the gripping, turning or twisting motions are done here. The rotation of the wrist is achieved by a motor 144 energized by switch 176, located on the member 120. Affixed to the motor 144 for rotation is the pinion 142 which meshes with geared portion 140 of the cylinder 138, thereby causing the hand mechanism 130 to rotate about the longitudinal axis of the wrist 120, for example when a bolt is to be turned or a nut taken off.

Located within the wrist member 120 is a motor 152, which is energized by switch 178. Motor 152 causes a reciprocal plunger 149 to be projected or retracted and thereby causes the jaw elements 146 to open or close to enable the operator to grasp a desired object.

In FIG. 2 it can be assumed that the operator has de-mated or de-mounted the engine from the air frame, removed it therefrom and taken it to a service area 180. In the figure he has removed a part or element 182 from the engine and by proper positioning of the different sections of the manipulator 26, he has brought the part 182 into a viewing position a few inches in front of the observation window 22 of the cab 20 for close inspection.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims are intended to cover all of the generic and specific features of the invention herein described and all statements of the scope of the invention which, as a matter of language, might be said to fall therebetween.

What is claimed:

1. A material handling unit comprising a support means, a first means supported by the support means so as to be projectable and retractable with respect thereto, a second means comprised of first and second sections, the first section being attached at one end to one end of said first means so as to form a pivotal joint with said first means, the second of said sections being movable in a reciprocal and a rotatable direction relative to said first section, said second section being projectable only from one end of said first section, a mechanical linkage connected at one end to the second section to form a second pivotal joint with said second section, and gripping means connected to the other end of said linkage.

2. A material handling unit in accordance with claim 1 in which said linkage includes a first member having one end thereof constituting said one end of the linkage which is pivotally connected to the second means, and a second member pivotally connected at one end to the other end of said first member, the other end of said second member constituting the other end of said linkage.

3. A material handling unit in accordance with claim 2 in which said gripping means is rotatably connected to said second member for rotation about its own longitudinal axis.

4. A material handling unit comprising a support means, a first means supported by the support means so as to be movable along a horizontal axis with respect to said support means, a second means carried by said first means for rotation relative thereto about said horizontal axis, a third means comprised of first and second sections, one end of the first section being attached to said second means so as to form a pivotal joint with said second means, the second of said sections being movable in a reciprocal and a rotatable direction relative to said first section, a fourth means connected at one end to form a second pivotal joint with said third means, and gripping means connected to said fourth means for rotation about its own longitudinal axis.

5. A material handling unit in accordance with claim 4 in which said fourth means is comprised of first and second sections pivotally connected together to form a third pivotal joint.

6. A material handling unit comprising a support means, first means carried by said support means for relative movement along a first axis which is horizontal, second means rotatably carried by said first means for rotation about said first axis, third means pivotally attached to said second means for pivotal movement about a second axis which is perpendicular to said first axis, fourth means rotatably and extensibly mounted on said third means about and along a third axis capable of assuming various degrees of angularity relative to said first axis depending upon the angularity of said third means relative to said second means and the rotative position of said second means relative to said first means, fifth means pivotally connected to said fourth means for pivotal movement about a fourth axis perpendicular to said third axis, gripping means supported by said fifth means for relative rotation about its own longitudinal axis and relative to said fourth axis.

7. A material handling unit in accordance with claim 6 including sixth means intermediate said fifth means and said gripping means, said sixth means being pivotally connected to said fifth means for pivotal movement about a fifth axis perpendicular to said fourth axis, whereby the longitudinal axis of said gripping means may be positioned at various angles with respect to said fourth axis.

8. A material handling unit in accordance with claim 7 in which said support means is rotatable about a vertical axis.

9. A material handling unit comprising a support means, a first means supported by the support means so as to be movable along a horizontal axis relative to said support means, said first means having a projecting end, a second means attached at the projecting end of said first means and being rotatable at said projecting end about a horizontal axis provided by the first means, a third means comprised of first and second sections, one end of the first section being attached to said second means so as to form a pivotal joint with said second means, the second of said sections being movable in a reciprocal and a rotatable direction relative to said first section, a fourth means connected at one end to form a second pivotal joint with said third means, and gripping means connected to said fourth means for rotation about its own longitudinal axis.

10. A material handling unit comprising a boom support, a boom member mounted on said support so as to be movable along the longitudinal axis of the boom, a relatively short shoulder support attached at one end to the free end of the boom, said shoulder support being rotatable about said longitudinal boom axis and having a transverse shoulder joint near said one end, an upper arm comprised of two sections, the first section being pivotally connected at one end to the shoulder joint of said shoulder support for pivotal movement about the transverse axis provided by said shoulder joint, the second of said sections being movable in a reciprocal and a rotatable direction relative to said first section, a forearm pivotally connected at one end to the second section of said upper arm for pivotal movement about a transverse axis, and a hand mechanism carried by said forearm, said hand mechanism being rotatable about its own longitudinal axis.

11. A material handling unit comprising a support, means for moving said support around a working area and thereby positioning the support at any of a plurality of desired working locations within the area, means for rotating said support on a vertical axis, a boom mounted on said support and having at least one portion movable along the longitudinal axis of the boom between extended and retracted positions with reference to said support, a member connected to said one portion of the boom for rotation about the longitudinal axis of the boom, an upper arm comprised of first and second sections, the first section being attached to said rotatable member so as to form a pivotal joint with said member, the second of said sections being movable in a reciprocal and a rotatable direction relative to said first section, a forearm pivotally connected at one end to said second section, and gripping means carried by the other end of said forearm.

12. A material handling unit comprising a mobile vehicle, a vertical shaft projecting up from the top of said vehicle, a horizontal boom support affixed to the upper end of the shaft for rotation about the vertical axis of said shaft, a boom member telescopically received in said boom support for projection and retraction relative to said boom support, a shoulder support carried by the free end of the boom member for rotation about the longitudinal axis of said boom member, an upper arm comprised of two sections, the first of which sections is pivotally connected to said shoulder support for pivotal movement about a transverse axis thereby forming a shoulder joint, and the second of which sections is rotatably and extensibly carried by said first section, a forearm pivotally connected at one end to said second section for pivotal movement about a transverse axis, a wrist member pivotally connected at one end to the other end of said forearm and a hand mechanism mounted on said wrist member so as to be rotatable about its own longitudinal axis, said hand mechanism including a pair of relatively movable jaws carried thereon.

13. A material handling unit comprising a support means, a horizontal boom member mounted on said support means for projection and retraction relative to said support means, first motor means on said support means for effecting projection and retraction of said boom member, a shoulder support carried by the free end of the boom member for rotation about the longitudinal axis of said boom member, second motor means on said boom member for effecting rotation of said shoulder support, an upper arm comprised of two sections, the first of which sections is pivotally connected to said shoulder support for pivotal movement about a transverse axis thereby forming a shoulder joint, and the second of which sections is rotatably and extensibly carried by said first section, third motor means on said shoulder support for effecting pivotal movement of said first section, fourth motor means on said upper arm for effecting rotation of said second section, fifth motor means on said upper arm for extending said second section, a forearm pivotally connected at one end to said second section for pivotal movement about a transverse axis, sixth motor means on said second section for effecting pivotal movement of said forearm, a wrist member connected at one end to the other end of said forearm, a hand mechanism mounted on said wrist member so as to be rotatable with respect thereto about its own longitudinal axis, and seventh motor means on said wrist member for rotating said hand mechanism about its longitudinal axis.

14. A material handling unit in accordance with claim 13 in which said wrist member is pivotally connected to said forearm about a transverse axis, and eighth motor means on said forearm for effecting pivotal movement of said wrist member.

15. A material handling unit in accordance with claim 14 including a mobile vehicle, said support means being rotatably mounted on said vehicle for rotation about a vertical axis, and with motor means on said vehicle for effecting rotation of said support means.

16. A material handling unit comprising a support means, first means supported by the support means, said first means being projectable and retractable with respect to said support means, second means pivotally connected at one end to said first means, said second means being pivotal about a first axis, said second means comprised of a first section and a second section, said second section being reciprocally and rotatably movable with respect to said first section and being projectable only from one end of said first section, a mechanical linkage pivotally connected to said second section, said linkage being pivotal about a second axis, and gripping means connected to said linkage.

17. A material handling unit comprising a support means, first means supported by the support means so as to be projectable and retractable with respect to said support means, second means pivotally connected at one end to said first means, said second means comprised of a first section and a second section, third means pivotally connected at one end to said second means, said third means comprised of a first section and a second section, at least one of said second sections of the second and third means being movable in a reciprocal direction with respect to its complementing first section, and gripping means connected to a second end of said third means.

18. A material handling unit comprising a support means, first means supported by the support means so as to be projectable and retractable with respect to said support means, second means pivotally connected at one end to said first means, said second means comprised of a first section and a second section, third means pivotally connected at one end to said second means, said third means comprised of a first section and a second section, at least one of said second sections of the second and third means being movable in a reciprocal and rotatable direction with respect to its complementing first section, and gripping means connected to a second end of said third means.

19. A material handling unit comprising a support means, first means supported by the support means so as to be projectable and retractable with respect to said support means, second means pivotally connected at one end to said first means, said second means being pivotal about a first axis and being comprised of a first section and a second section, said second section rotatably movable with respect to said first section, third means pivotally connected at one end to said second means, said third means being pivotal about a second axis, and being comprised of a first section and a second section, at least one of said second sections of the second and third means being movable in a reciprocal direction with respect to its complementing first section, and gripping means connected to a second end of said third means.

References Cited in the file of this patent

UNITED STATES PATENTS

| | | |
|---|---|---|
| 2,632,574 | Goertz | Mar. 24, 1953 |
| 2,746,612 | Wirz | May 22, 1956 |
| 2,822,094 | Greer | Feb. 4, 1958 |
| 2,861,699 | Youmans | Nov. 25, 1958 |

OTHER REFERENCES

The Mechanical Arm, published by Mechanical Div. of General Mills, Inc., 1620 Central Ave., Minneapolis 13, Minn. Recd. in Patent Office Sept. 27, 1955.